United States Patent
Haeckel (10) Patent No.: US 9,982,820 B2
(45) Date of Patent: May 29, 2018

(54) FLUIDIC PLUG UNIT AND CONNECTING DEVICE FOR LIQUID CONDUCTING COMPONENTS

(71) Applicant: DIONEX SOFTRON GMBH, Germering (DE)

(72) Inventor: Michael Haeckel, Germering (DE)

(73) Assignee: DIONEX SOFTRON GMBH, Germering (DE)

( * ) Notice: Subject to any disclaimer, the term of this patent is extended or adjusted under 35 U.S.C. 154(b) by 777 days.

(21) Appl. No.: 14/023,888

(22) Filed: Sep. 11, 2013

(65) Prior Publication Data

US 2014/0070530 A1    Mar. 13, 2014

(30) Foreign Application Priority Data

Sep. 13, 2012  (DE) .................. 10 2012 108 566

(51) Int. Cl.
  *F16L 21/04*   (2006.01)
  *F16L 21/035*  (2006.01)

(52) U.S. Cl.
  CPC ........... *F16L 21/045* (2013.01); *F16L 21/035* (2013.01)

(58) Field of Classification Search
  CPC ........ F16L 21/03; F16L 21/035; F16L 21/045
  USPC ................. 285/196, 332.2, 347, 344, 338
  See application file for complete search history.

(56) References Cited

U.S. PATENT DOCUMENTS

| | | | |
|---|---|---|---|
| 2,477,533 A * | 7/1949 | Whiting | F16L 21/035 285/347 |
| 3,016,250 A * | 1/1962 | Franck | F16L 19/065 285/347 |
| 4,131,547 A | 12/1978 | Michel et al. | |
| 4,645,245 A * | 2/1987 | Cunningham | F16L 37/088 285/347 |
| 6,273,478 B1 | 8/2001 | Benett et al. | |
| 2005/0046187 A1* | 3/2005 | Takeuchi | F16L 21/035 285/348 |
| 2006/0232066 A1* | 10/2006 | Kanagae | F16L 21/035 285/348 |

(Continued)

FOREIGN PATENT DOCUMENTS

| | | |
|---|---|---|
| AU | 2005250885 B2 | 12/2005 |
| CN | 2087340 U | 10/1991 |

(Continued)

OTHER PUBLICATIONS

U.S. Appl. No. 14/115,143, filed Apr. 25, 2012, Buerger et al., spec, claims, abstract, drawings only.

(Continued)

*Primary Examiner* — Greg Binda
*Assistant Examiner* — Zachary T Dragicevich (57) ABSTRACT

A fluidic plug unit for liquid-conducting components, in particular for high-performance liquid chromatography, includes a plug housing that has a plug region with a front plug region and a rear plug region which is adjoined thereto in an axial direction. The plug unit is designed for connection to a bushing unit. In a connected state of the plug unit and bushing unit, an annular space, which is substantially closed on all sides, is formed for a sealing element of the plug unit, the annular space being bounded by an outer wall of the front plug region and an inner wall of the receiving recess of the bushing unit.

28 Claims, 2 Drawing Sheets

(56) References Cited

U.S. PATENT DOCUMENTS

| | | | | |
|---|---|---|---|---|
| 2007/0009321 A1* | 1/2007 | Yasui | .................... | B60T 11/26 |
| | | | | 403/226 |
| 2007/0095414 A1* | 5/2007 | Dorn | ................. | F16C 29/0635 |
| | | | | 138/44 |
| 2008/0054635 A1* | 3/2008 | Skiba | .................... | F16L 21/035 |
| | | | | 285/347 |
| 2009/0026762 A1* | 1/2009 | Kitagawa | ............... | F16J 15/061 |
| | | | | 285/344 |
| 2010/0269956 A1* | 10/2010 | Iida | ........................ | F16L 21/03 |
| | | | | 141/311 R |
| 2011/0298210 A1 | 12/2011 | Hochgraeber et al. | | |
| 2012/0061955 A1 | 3/2012 | Hochgraeber et al. | | |
| 2015/0076817 A1* | 3/2015 | Bizzarrini | ........... | F16L 33/2075 |
| | | | | 285/374 |

FOREIGN PATENT DOCUMENTS

| | | |
|---|---|---|
| CN | 202141703 U | 2/2012 |
| CN | 102439437 A | 5/2012 |
| DE | 202007012286 U1 | 2/2009 |
| DE | 102008059897 A1 | 6/2010 |
| DE | 102009022313 A1 | 12/2010 |
| DE | 10201105003783 | 6/2012 |
| FR | 2844026 A1 | 3/2004 |
| JP | 4813918 | 2/1973 |
| JP | 56150352 | 11/1981 |
| JP | 56150353 | 11/1981 |
| JP | 680170 | 11/1994 |
| JP | 10170490 | 6/1998 |
| WO | 2007009493 A1 | 1/2007 |

OTHER PUBLICATIONS

Office Action dated Aug. 18, 2014 in corresponding Japanese Patent Application No. 2013-181177.

* cited by examiner

FLUIDIC PLUG UNIT AND CONNECTING DEVICE FOR LIQUID CONDUCTING COMPONENTS

CROSS REFERENCE TO RELATED APPLICATIONS

This application claims the priority benefit under 35 U.S.C. § 119 to German Patent Application No. 10 2012 108 566.8, filed on Sep. 13, 2012, the disclosure of which is incorporated herein by reference.

FIELD OF INVENTION

The invention relates to a fluidic plug unit for liquid-conducting components, in particular for high-performance liquid chromatography (HPLC), and also to a fluidic connecting device consisting of such a plug unit and a bushing unit suitable therefor.

BACKGROUND

In HPLC, substances are separated by being rinsed under high pressure through a column with the aid of a solvent. Pumps which can deliver a constant flow rate continuously at high pressure are required for this. In order to achieve more rapid or better dissolved separations in HPLC, the trend is toward even higher pressures of 1500 bar and more.

An HPLC system contains a plurality of components which have to be fluidically connected to one another and sealed off from one another. For the connection, use is made of capillary tubes which are connected to standardized bushing units. For some components, however, direct assembly in a small construction space is desired. This is true, for example, of nonreturn valves or filters. A different method for ensuring a tight connection has to be used therefor.

In HPLC, piston pumps are used for producing the liquid pressure. These pumps require at least one inlet valve and one outlet valve which have to be connected to the pump head in which the working cylinder is located. There are particularly stringent requirements regarding the load-bearing capacity for the connections between the pump head and the valves, since said connections are exposed not only to the relatively constant system pressure at the pump outlet but also, during each piston stroke of the pump, to a continuous change between ambient pressure and system pressure.

In order to achieve a good compression ratio, the liquid volume in the connection and in the supply lines has to be as small as possible. This is because a dead volume in the supply lines or connections increases the overall volume, and therefore, for the same piston stroke, the pump is able to produce only a smaller system pressure or—in the case of a predetermined system pressure, only a smaller delivery volume per piston stroke; this is because some of the piston stroke is required for compression of the liquid until the system pressure is reached.

A suitable connection for such components of HPLC should not have too high a flow resistance on the inlet side so that rapid intake of the required liquid volume is possible. A minimum inside diameter must therefore be observed.

In addition, when valves and pumps are connected, the connection frequently has to have a short overall length in order to be able to form the entire pump unit as compactly as possible.

Finally, the press-on force required for producing the connection should be able to be applied in a simple manner, preferably without a tool. Screw connections, the interacting threads of which have a relatively large diameter and a relatively small pitch because of the small axial extent as a consequence of the shortest possible overall length, are suitable therefor. Screw connections of this type can also be closed manually even under the high sealing pressure which can be applied.

Known seals of valves have generally annular sealing elements made of PEEK or of another elastomer, said sealing element sealing off the components of the valve on the end side in relation to the valve housing and also sealing off the valve on the end side in relation to the components lying therearound. Said seals are still reliable at 1000 bar. However, at higher pressures, in particular the sealing element on the inlet side of the valve begins to extrude during operation, and thus loses prestress and becomes untight.

Valves according to the prior art which have a housing consisting entirely of metal are sealed off either with PEEK flat seals or with a conical or curved metal seal. In the case of the flat seals, very exacting requirements are imposed on the surface quality of the metal surfaces and very high prestress is required, said prestress also having to be present even under maximum liquid pressure. This is not entirely simple because the small thickness of a flat seal provided on the end side means that said seal has scarcely any elasticity (or only a small elastic spring deflection). Metal seals are extremely sensitive to small impurities, and there is the risk that, in the case of repeated installation, not only the valve, but also the sealing surface of the pump head will be damaged.

FIG. 5 in DE 10 2008 059 897 A1 illustrates one possibility of how a filter can be connected directly to a bushing unit designed for capillary tubes. However, disadvantages in this case include the fact that said connection requires a relatively large number of components and requires a relatively large overall length. An additional plug housing for prestressing the seal is required. The force cannot be applied directly by means of the filter because then the tube rather than the seal would press onto the bushing unit. In addition, it is virtually impossible to manufacture the filter with the required long capillary tube in one piece because an extremely long and thin hole would have to be drilled. The tube would have to be even longer than that illustrated in FIG. 5 of DE 10 2008 059 897 A1 since, for the production of the application region, a tool has to be fitted from behind. It is also proposed here to weld an extruded capillary tube to the structural element, which is associated with a corresponding outlay in terms of production technology.

For high-pressure connections outside HPLC, metal tubes with conical ends are generally pressed into matching conical counterparts. The metal-seal disadvantages already referred to are present in this case.

Within the pressure range of up to approx. 20 bar, O rings which partially fill a groove are used for compressed-air and water-hose connections. Said O rings are prestressed by the mounting thereof and, upon application of a pressure in the medium, are pressed further in the direction of the gap which is to be sealed. However, within the high-pressure range at up to 2000 bar, the deformation of the sealing ring that takes place because of elasticity and compressibility is a serious problem. In the event of a dynamic load, the continuous movement of the seal can result in mechanical wear due to abrasion. In addition, there is a substantial deterioration in the compression ratio of the pump if the sealing ring also has to be compressed in addition to the medium.

SUMMARY

Starting from this prior art, the invention is based on the object of providing a fluidic plug unit for liquid-conducting components, in particular for high-performance liquid chromatography, and a fluidic connecting device consisting of such a plug unit and a bushing unit suitable therefor, which plug unit and bushing unit are constructed and are mountable in a simple manner, have a small overall size and, even under extremely high pressures, still have the required tightness and long-term stability, even under dynamic loadings. Furthermore, the plug unit and the connecting device are intended to have a low dead volume and a low flow resistance. On removal of the plug unit, it is intended to ensure that the sealing element does not remain in the bushing unit.

The invention is based on the finding that excellent long-term stability of the plug unit and of the entire connection consisting of the plug unit and of the bushing unit coupled thereto can be ensured if the plug region of the plug unit and the receiving recess of the bushing unit are designed in such a manner that, in the connected state of the plug unit and bushing unit, an annular space, which is substantially closed on all sides, is formed for the sealing element, said annular space being bounded by the outer wall of the front plug region and the inner wall of the receiving recess of the bushing unit. By means of provision of the sealing element in a fastening region of the front plug region between a head region of the front plug region and the rear plug region, it can be ensured that, when the connection is released, the sealing element remains on the plug region and does not remain behind in the bushing unit. In addition, by the groove being filled by means of the sealing element, at predetermined external dimensions of the plug region (for example by means of standardized internal dimensions of the bushing unit), the volume of the sealing element increases with the axial extent remaining the same. This ensures secure sealing at small dimensions of the plug unit, since there is a sufficiently large volume of sealing material which, during the installing of the connection by means of the elastic and/or plastic deformation of the sealing element (optionally also in the case of compression of the sealing material as a consequence of the high pressure which is exerted on the sealing material during the installation in order to ensure the tightness of the connection even under high system pressures used in HPLC), completely fills the annular space formed by the plug unit and the bushing unit and, in the process, acts upon the bounding walls with the desired high pressure. The gaps, which remain in the mounted state of the connection, between the walls of the plug unit and the bushing unit, which walls bound the annular space, which is substantially closed on all sides, for the sealing element, are selected to be of such a small size, depending on the material properties of the sealing element, that the sealing material cannot extrude through the gaps either because of the prestress or because of the liquid pressure.

According to a refinement of the invention, the fastening region can be designed as a groove region in which the annular sealing element is held or around which the annular sealing element (35) engages. By this means, at least after the plug unit and a corresponding bushing unit have been assembled, the sealing unit is fastened axially on the plug unit such that, when the connection is released, said sealing element is pulled out of the bushing unit at the same time. In principle, however, any other suitable connection can be used for the axially sufficiently firm connection of the sealing element to the fastening region, wherein the fastening region can also have the same cross section as the head region. A suitable type of fastening includes, for example, adhesive bonding or the production of a frictional connection (for example by shrinking-on or radially pressing-on the sealing element by means of an annular press-on element engaging around the sealing element).

For the simple releasable connection of the plug unit to the bushing unit, a mounting region for connecting the plug unit to a bushing unit can be provided on the plug unit.

The mounting region can comprise a thread which is provided on the rear plug region or on a part connected thereto, in particular a flange region, and which is connectable to a thread of the bushing unit which is couplable to the plug unit. However, the provision of the thread on the rear plug region customarily has the disadvantage that said thread has to be provided over a relatively large axial length in order to absorb the required high axial force (which is required for producing the high sealing pressure within the sealing element), since the circumference of the rear plug region is customarily relatively small. It is therefore advantageous to provide the thread of the plug unit in a region or on a part of the plug unit that has a larger diameter. In particular, a flange region which is connected to the rear plug region is suitable for this.

However, in another embodiment, such a flange region can be designed in such a manner that it permits screwing of the plug unit to the bushing unit.

According to an embodiment of the plug unit and connecting device according to the invention, which embodiment is simple to produce, the head region of the plug unit, at least in an axially rearward subregion adjacent to the groove region, has a circumferential surface which is parallel to the longitudinal axis of the plug housing. A parallel circumferential surface is understood here as meaning any surface which, in any axial longitudinal section (i.e. irrespective of the choice of sectional plane which runs through the longitudinal axis), has a line of intersection parallel to the longitudinal axis of the plug housing. If the rear receiving recess of the bushing unit that interacts with the head region of the plug unit likewise has, at least in the axial region concerned (which, in the fitted state of the connecting device, receives the head region with the parallel circumferential surface), an inner wall which is parallel to the longitudinal axis of the bushing unit, and if the opening cross section in this region substantially corresponds to the outer contour of the head region, then this ensures a very small gap between the walls of the bushing unit and the plug unit, which walls bound the annular space for the sealing element, even before the mounted state is achieved. This reliably prevents extrusion of the sealing material during the production of the final fitting position.

According to an embodiment of the invention, the annular sealing element can also have, over the axial extent thereof, a circumferential surface which is parallel to the longitudinal axis of the plug housing and, even in the unfitted state, is substantially aligned with a circumferential surface of the rear plug region, which circumferential surface is likewise parallel to the longitudinal axis of the plug housing. The term of the parallel circumferential surface or circumferential wall is also used here within the context explained above. This involves an embodiment of the plug unit that is simple to produce. If the outer receiving recess of the bushing unit here also has an axially parallel inner wall, and if the opening cross section of the outer receiving recess substantially corresponds to the outer contour of the cross section of the rear plug region, this in turn affords the advantage that, in the mounting of the connecting device, the annular space for the sealing element is also already closed on the rear side of the sealing element (as seen in the direction of insertion of the plug unit into the bushing unit) even before the final relative position of the plug unit and bushing unit is achieved. Extrusion of the sealing material during the movement of the plug unit into the final mounting position can thereby be reliably avoided. Since the outer contour of the sealing element is substantially aligned with the outer contour of the rear plug region, only a relatively small elastic or plastic deformation of the sealing element is required in order to achieve complete sealing. At the high pressure used in HPLC for the prestress, the starting point here can be the virtually hydraulic behavior of the sealing material within the sealing element.

The axially parallel walls of the head region and of the front and rear plug regions and also of the sealing element can have a substantially circular-cylindrical outer contour in order to ensure that production can be simple.

The sealing element can have a flat end surface which is in the shape of a circular ring and runs substantially perpendicularly to the longitudinal axis of the plug housing. By this means, at least at the beginning of the sealing element being acted upon by the press-on force, virtually the entire force is exerted on the end surface, as a result of which a high pressure rapidly builds up within the front (bushing-interior) region of the sealing element, said high pressure being transmitted virtually hydraulically within the sealing element to all of the walls bounding the annular space.

BRIEF DESCRIPTION OF THE DRAWINGS

The invention is explained below with reference to an exemplary embodiment which is illustrated in more detail in the drawing. In the drawing

DETAILED DESCRIPTION OF EMBODIMENTS

Figure 1:
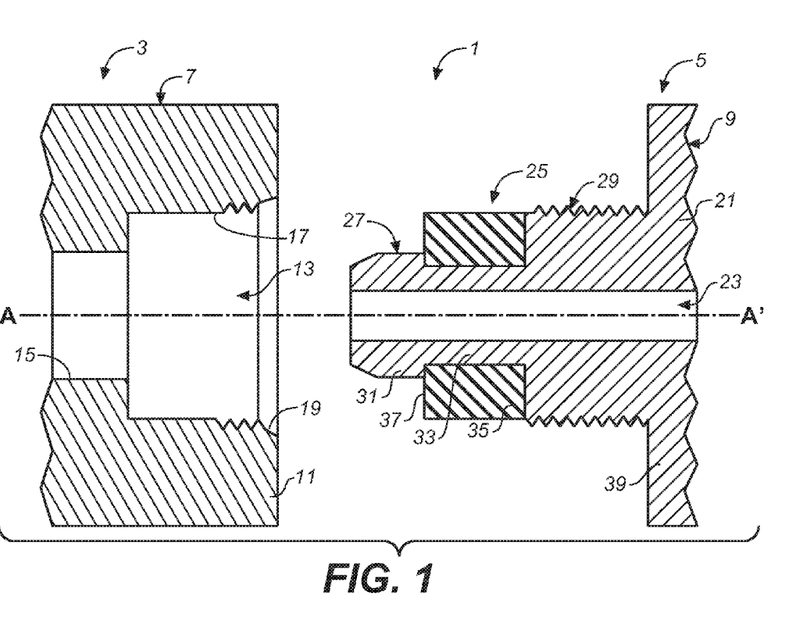
FIG. 1 shows a schematic illustration of an embodiment of a connecting device according to the invention with a bushing unit and a plug unit in axial longitudinal section in the unmounted state.

FIG. 1 shows a connecting device 1 for the fluidic connection of a first liquid-conducting component 3, in particular an HPLC component, such as an HPLC pump, and a second liquid-conducting component 5, in particular an HPLC component, such as a nonreturn valve. For simplicity reasons, of the components, only those parts which concern the connecting device 1 are illustrated. The connecting device itself comprises a bushing unit 7 provided on the first component 5 and a plug unit 9 provided on the second component.

The bushing unit 7 comprises a bushing housing 11 made of a sufficiently strong material (such as, for example, steel, preferably special steel, or a titanium alloy), in which a receiving recess 13 which has a longitudinal axis A is provided. The receiving recess 13 comprises an inner receiving recess 15 with a smaller opening cross section and an outer receiving recess 17 which is adjoined thereto in the axial direction and has a larger opening cross section. The outer receiving recess 17 can be extended once again in an outermost region, for example by the provision of a beveled region 19, in order to facilitate the introduction of the plug unit 9.

In the exemplary embodiment illustrated, the inner receiving recess 15 and the outer receiving recess 17 have a constant cross section along the axis A, wherein the transition extends in the manner of a jump.

The plug unit 9 has a plug housing 21 which has a channel 23, which runs along a longitudinal axis A' of the plug housing, for the liquid to be conducted. The channel 23 can be designed as an axial bore. The plug housing 21 is likewise composed of a sufficiently strong material, for example steel, special steel or a titanium alloy, and therefore the plug housing 21 withstands the pressure of the liquid to be conducted. Furthermore, the plug housing 21 and the bushing housing 11 and at least those inner walls of the channel 23 and of the receiving recess 13 that enter into contact with the liquid to be conducted are preferably composed of a material inert to the liquid to be conducted.

Both the plug housing 21 and the bushing housing 11 can be formed in one piece with a further part of the second or of the first component 5, 3.

The plug housing 21 has a plug region 25 which consists of a front plug region 27 and a rear plug region 29. The front plug region is divided in the axial direction into a head region 31 and into a fastening region designed as a groove region 33. However, the groove region 33 does not necessarily have to extend, as illustrated in FIG. 1, as far as the rear plug region 29. The groove region 33, however, has to be designed in such a manner that it is suitable for holding an annular sealing element 35 on the plug region. As illustrated in FIG. 1, the sealing element can be of substantially rectangular design in axial longitudinal section.

The outer contour of the head region 31 is designed in such a manner that it substantially corresponds to the opening cross section of the inner receiving recess 15. The inner receiving recess 15 is of such deep design in the axial direction that it can receive the full axial length of the head region 31. At least the axial region of the rear plug region 29 has such an outer contour that it corresponds in cross section substantially to the opening cross section of the axial region, which interacts therewith, of the outer receiving recess 17 (see the description below).

The outer contour of the sealing element 35 is preferably also selected in such a manner that it corresponds in cross section substantially to the opening cross section of the axial region, which interacts therewith, of the outer receiving recess 17 (see the description below).

With regard to making production as simple as possible, the inner and the outer receiving recesses 15, 17 have a respectively constant opening cross section over the entire axial length. However, this is not absolutely required. It merely has to be ensured, as will become clear from the explanations below, that, at least in the mounted state, the sealing element 35 is bounded on all sides by the circumferential wall of the plug region 25 and the inner wall of the receiving recess 13. At least in the mounted state (FIG. 4), the gaps between said walls have to be of such a small size that, even under the pressure which can be tolerated of the liquid to be conducted (said liquid can flow from the first to the second component 3, 5 or vice versa; of course, there can also be a static liquid column under corresponding pressure in the channel 23 or in the inner receiving recess), the material of the sealing element 35 cannot extrude through the gaps.

As shown in FIG. 1, the groove region 33 can be designed as an encircling groove with a constant depth and width. In order to fix the sealing element 35 on the plug region 25, it would also suffice, however, if the groove, as seen over the circumference, were only partially formed or were to have a varying depth. It would also suffice if the inner wall of the annular sealing element 35 were to have an encircling projection which engages in a corresponding groove on the front plug region 27. In all of these possible alternatives, it would be ensured that, when the connecting device 1 is removed, the sealing element 35 remains on the plug unit 9 and does not have to be removed retrospectively with possibly greater effort from the receiving recess 13 of the bushing unit.

However, the fastening region for the axial fixing of the sealing element 35 cannot only be designed as a groove region 33, but also in any suitable other way which makes it possible to ensure a sufficiently secure axial fixing of the sealing element 35 on the fastening region (at least after the initial mounting of the plug unit and bushing unit). A suitable manner of fastening includes, for example, adhesive bonding or the production of a frictional connection (for example by shrinking-on the sealing element 35). The fastening region here can also have the same cross section as the head region.

Within the axial length of the fastening region it is also possible to provide suitable means for fixing the sealing element 35, for example one or more annular elements which engage around the sealing element 35 and produce a radial press-on pressure which results in a sufficient frictional connection between the sealing element and the fastening region. For this purpose, the one or more annular elements can be pressed on or crimped. According to another embodiment, the rear plug region 29 can be provided with retaining means which interact with the sealing element 35 with the axial fixing thereof.

In principle, within the context of the present description, the term the fastening region is to be understood as meaning the axial extent of at least part of the axial length of that part of the plug unit 9 which bears the sealing element 35, within which plug unit suitable means for the axial fixing of the sealing element are provided. Of course, the axial length of the fastening region can also correspond to the axial length of the sealing element.

The sealing element 35 is composed of a material, preferably a plastic, such as polyetherketone (PEK), in particular of a polyetheretherketone (PEEK) which is capable, in the long term and at the desired long-term stability, of maintaining a sufficiently high pressure in the annular space which bounds the sealing element 35 and ensures the tightness of the connecting device in relation to the liquid pressure. The pressure required for this purpose within the material of the sealing element is produced by the application of a correspondingly high prestress during the mounting of the connecting device. Further suitable materials for the sealing element 35 also include, for example, polytetrafluoroethylene (PTFE) or a high density polyethylene (PE-HD).

The tightness of the connection is preferably ensured by the fact that the pressure at which the sealing element 35 acts upon the surrounding walls is greater than the liquid pressure. However, the tightness of the connection can also be produced if, although the pressure caused by the prestress produced by the mounting of the connecting device is smaller than the liquid pressure, when the sealing element is acted upon by the liquid pressure, however, the pressure in the sealing element is thereby increased beyond the pressure produced by the prestress to the extent that the connection is sealed. In the embodiment illustrated in the drawing, the sealing element 35 is acted upon by the liquid pressure on the end side 37 of the sealing element 35.

The prestress is therefore applied on the end side over a small cross section and expands virtually hydraulically in the entire sealing ring. By this means, a high prestress pressure can be achieved by a relatively low force. If the pressure of the prestress is higher than the maximum liquid pressure which occurs, the sealing ring is not compressed further during operation. The sealing ring is retained in a groove on the plug unit when the connection is released.

The mounting of the connecting device is explained in more detail below with reference to FIGS. 2 to 4.

Figure 2:
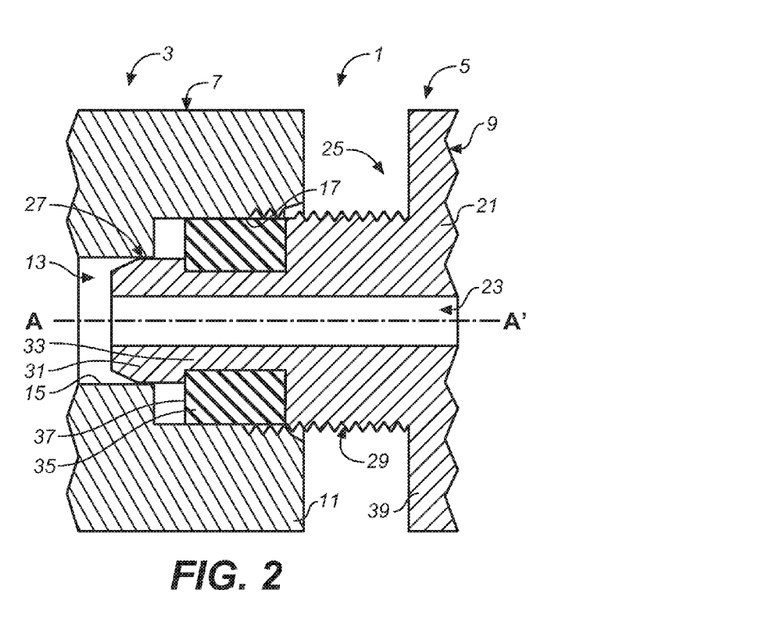
FIG. 2 shows an illustration of the connecting device of FIG. 1 during the mounting in a mounting position, from which the annular space for the sealing element is closed on all sides.

FIG. 2 shows a state of the connecting device 1 during the mounting, in which the plug region 25 has already been pushed into the receiving recess 13 of the bushing unit to such an extent that the head region 31 engages in the inner receiving recess 15 and the front part of the rear plug region 29 engages in the external part of the outer receiving recess 17. An annular space which is substantially closed on all sides is therefore already provided for the sealing element 35. Of course, the axes A and A' of the receiving recess 13 and of the plug region 25 are also already aligned. Therefore, even in the unmounted state, the axial length of the sealing element 35 should preferably be smaller than or equal to the axial length (depth) of the outer receiving recess 17.

Figure 3:
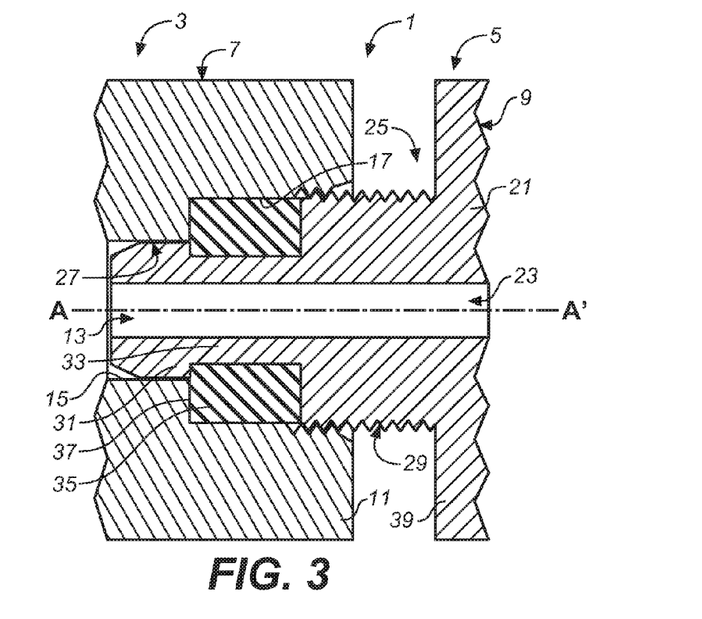
FIG. 3 shows an illustration of the connecting device in FIG. 1 during the mounting in a mounting position, from which the compression of the sealing element begins.

FIG. 3 shows the connecting device 1 in a mounting state, in which the sealing element 35 bears with its end side 37 precisely against the annular, base-side inner wall of the outer receiving recess 17 and from which the pressurization of the sealing element 35 begins as plug unit 9 and bushing unit 7 are pushed further one into the other.

It should be mentioned at this point that, of course, the plug unit 9 is connected, preferably releasably, to the bushing unit 7. In this case, use can be made of any suitable connecting technique, for example screwing. For this purpose, an external thread (not illustrated) can be provided, for example, on the outer circumference of a flange region 39 of the plug unit 9, which flange region is connected to the rear plug region 29, said external thread interacting with an internal thread (not illustrated) provided on the bushing housing 11. However, an external thread can also be provided directly on the rear plug region 29, the external thread interacting with an internal thread provided on the axially outer part of the outer receiving recess. In this alternative, because of the customarily small diameter of the plug region 25 from one to a few millimeters, the thread, however, has to have a relatively large axial length in order to be able reliably to absorb the high prestress required for sealing under high liquid pressures.

In another alternative which is likewise not illustrated, the flange region 39 can be connected to the bushing housing 11 by means of screws or bolts which engage in bores in the bushing housing 11 or reach through said bores.

Figure 4:
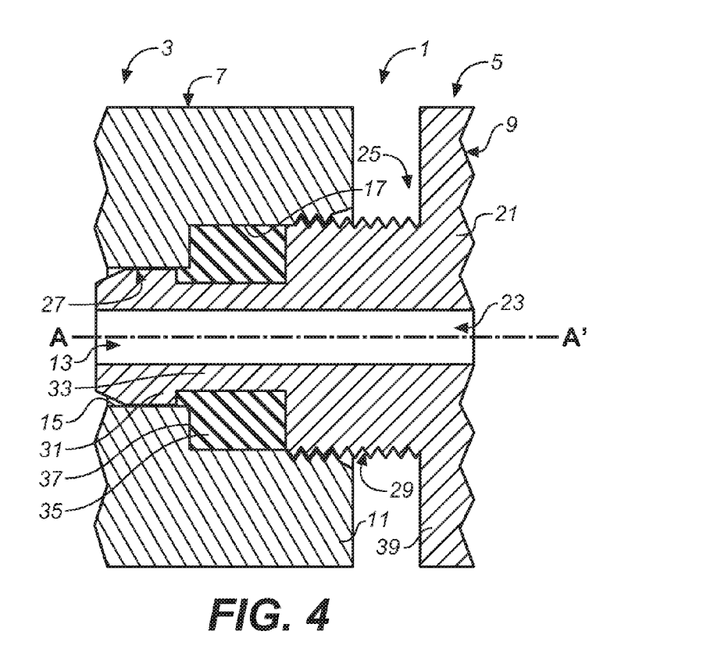
FIG. 4 shows an illustration of the connecting device in FIG. 1 in the ready mounted position, in which the compression of the sealing element has been completed.

FIG. 4 shows the connecting device in the ready mounted state. The groove region 33 protrudes here by a small axial length into the inner receiving recess 15. This is caused by the fact that the material of the sealing element 35 has a certain compressibility and also a certain plastic or elastic deformation of the sealing element takes place so that the material of the sealing element completely fills the annular space surrounding said sealing element.

The application of the sealing element 35 onto the plug region 25 in such a manner that, even in the starting state (before the first mounting), said sealing element engages in the groove of the groove region 33, can take place, for example, by hot deformation.

However, it is also possible to provide the sealing element of the plug unit 9 in such a manner that, before the initial mounting, said sealing element engages only insubstantially, if at all, in the groove region 33. For example, the annular sealing element 35 can have such an internal diameter that it can still be pushed onto the plug region 25 (into the groove region 33). The outer contour of the sealing element is intended to be provided here in such a manner that said sealing element can be pushed together with the plug unit 9 into the bushing unit 7 even without great force. Only by means of the deformation of the sealing element 35 during the mounting operation does said sealing element then engage in the groove. Since a deformation of this order of magnitude with the materials suitable for the sealing element 35 is virtually always associated with sufficient plastic deformation, it can be ensured that, during removal of the connecting device 1, the sealing element 35 remains on the plug unit 9.

The sealing element 35 here can also be designed in such a manner that, in the unmounted state, its axial length is greater than the axial extent of the groove of the groove region 33.

In principle, the design of the inner and outer receiving recesses 15, 17 with axially parallel walls has the advantage of making production simple. In addition, given a sufficiently small difference in cross section in said regions, the sealing element is acted upon on a relatively small end surface with the force which produces the prestress. Therefore, even with a relatively small press-on force between the bushing unit and plug unit, a high pressure can be produced in the sealing element 35.

As already mentioned, it is advantageous if the prestress produced by the press-on force in the sealing element 35 is greater than the maximum liquid pressure. The sealing element 35 seals off the annular space surrounding it both on the end side and also radially. If the axial length of the sealing element 35 is selected in such a manner that the circumferential sealing surface is large (at least by a factor of 5) in relation to the sealing-element end surface which is intentionally selected to be small and is acted upon by the press-on force, the result is a sealing surface of such a size overall that the connecting device becomes relatively insensitive to impurities in the region of the sealing surfaces.

Furthermore, by means of such a high prestress, the advantage is afforded that the sealing element 35 is not compressed further even when the maximum permissible liquid pressure is applied. The compressibility of the sealing element 35 therefore does not have an effect on properties of the relevant components 5, 7. If the first and second components 3, 5 involve an HPLC pump or a nonreturn valve to be connected thereto, then, for example, the compression ratio of the pump is not influenced by the compressibility of the sealing element 35 and no mechanical wear occurs.

Since the connecting device also does not require any connections whatsoever by means of thin capillaries, but rather permits a direct connection of the components 3, 5, there is also not the risk which exists in particular in the case of a dynamic load that connecting pipes may burst. In the case of the plug unit 9, excellent stability is achieved with small external dimensions of the plug region 25. In the rear plug region 29, the liquid pressure acts on a relatively thick wall thickness. In the groove region 33, the wall thickness of the plug region 25 is smaller, but said region is prestressed from the outside. As the liquid pressure rises, the wall is initially relaxed and then stretched in the opposite direction. As a result, a greater portion of the elastic region can be used than without prestressing.

LIST OF DESIGNATIONS

1 Connecting device
3 First component (on which the bushing unit is provided)
5 Second component (on which the plug unit is provided)
7 Bushing unit
9 Plug unit
11 Bushing housing
13 Receiving recess
15 Inner receiving recess
17 Outer receiving recess
19 Beveled region
21 Plug housing
23 Channel
25 Plug region
27 Front plug region
29 Rear plug region
31 Head region
33 Groove region
35 Sealing element
37 End side of the sealing element
39 Flange region
A Longitudinal axis of the receiving recess
A' Longitudinal axis of the plug region

What is claimed is:

1. A fluidic plug unit for high-performance liquid chromatography (HPLC) components comprising:
    a) a first liquid-conducting component comprising a plug housing that includes a liquid-conducting channel running along a longitudinal axis of the plug housing and configured to withstand HPLC pressures,
    b) wherein the plug housing further includes a plug region having a front plug region and a rear plug region that adjoins the front plug region in a direction running along the longitudinal axis of the plug housing, and the rear plug region having a larger cross section than the front plug region,
    c) wherein the front plug region has a head region and a fastening region, the fastening region being disposed between the head region and the rear plug region, and in which an annular sealing element is configured to be held in the fastening region when assembled, wherein the annular sealing element includes an end side adjacent the head region,
    d) wherein the plug unit is configured to connect to a bushing unit of a second liquid-conducting component which includes a receiving recess, the receiving recess comprising: an inner receiving recess configured to receive a substantial portion of the head region, and an outer receiving recess that adjoins the inner receiving recess in a direction running along a longitudinal axis of the receiving recess and configured to receive the fastening region and the rear plug region,
    in which the plug unit is further configured to have a connected state with the bushing unit in which an annular space, which is substantially closed on all sides, is formed for the annular sealing element, the annular space being bounded by an outer wall of the front plug region and an inner wall of the receiving recess,
    e) wherein the annular sealing element is configured to be deformable elastically when the plug unit is connected to the bushing unit where the annular sealing element completely fills the annular space surrounding the annular sealing element, which is substantially closed on all sides in the connected state of the plug unit and the bushing unit, and the end side of the annular sealing element bears against an annular base side of the inner wall of the receiving recess, wherein the annular sealing element acts upon the outer wall of the plug region, in which the outer wall of the plug region bounds the annular space which is substantially closed on all sides, and the inner wall of the receiving recess with a predetermined sealing pressure, and d) wherein the plug housing includes a mounting region configured to releasably connect the plug housing to the bushing unit.

2. The plug unit according to claim 1, in which the fastening region includes a groove region in which the annular sealing element is held.

3. The plug unit according to claim 2, in which the head region, at least in an axially rearward subregion adjacent to the groove region, has a circumferential surface which is parallel to the longitudinal axis of the plug housing.

4. The plug unit according to claim 1, in which the mounting region comprises a thread, wherein the thread of the mounting region connects to a thread of the bushing unit.

5. The plug unit according to claim 4, in which the thread of the mounting region is on the rear plug region of the plug housing.

6. The plug unit according to claim 5, in which the mounting region comprises a flange region that is connected to the rear plug region.

7. The plug unit according to claim 1, in which the annular sealing element has an outer circumferential surface which is parallel to the longitudinal axis of the plug housing and, in an unmounted state, the outer circumferential surface of the annular sealing element is substantially aligned with an outer circumferential surface of the rear plug region, the outer circumferential surface of the rear plug region also being parallel to the longitudinal axis of the plug housing.

8. The plug unit according to claim 1, in which the head region, the rear plug region, and the annular sealing element each include a substantially circular-cylindrical outer contour.

9. The plug unit according to claim 8, in which the annular sealing element further includes a flat end surface in the shape of a circular ring and is substantially perpendicular to the longitudinal axis of the plug housing, and in that a circumferential surface of the annular sealing element is larger than by about a factor of five in relation to the annular sealing element end surface.

10. The plug unit according to claim 1, in which the annular sealing element comprises polyetheretherketone.

11. The fluidic connecting device according to claim 1, in which the fastening region includes a groove region in which the annular sealing element is engaged.

12. A fluidic connecting device for the fluidic connection of high-performance liquid chromatography (HPLC) components, the fluidic connecting device comprising:

a) a second component comprising a plug unit that includes a plug housing which includes a channel running along a longitudinal axis of the plug housing and configured to withstand HPLC pressures, b) wherein the plug housing further includes a plug region having a front plug region and a rear plug region that adjoins the front plug region in a direction running along the longitudinal axis of the plug housing, and the rear plug region having a larger cross section than the front plug region, c) wherein the front plug region has a head region and a fastening region, the fastening region being disposed between the head region and the rear plug region, and in which an annular sealing element is configured to be held in the fastening region when assembled, wherein the annular sealing element includes an end side adjacent the head region, d) a first component comprising a bushing unit wherein the plug unit is configured to connect to the bushing unit, e) the bushing unit including a receiving recess, the receiving recess comprising: an inner receiving recess configured to receive a substantial portion of the head region, and an outer receiving recess that adjoins the inner receiving recess in a direction running along a longitudinal axis of the receiving recess and configured to receive the fastening region and the rear plug region, f) in which the plug unit is further configured to have a connected state with the bushing unit in which an annular space, which is substantially closed on all sides, is formed for the annular sealing element, the annular space being bounded by an outer wall of the front plug region and an inner wall of the receiving recess, g) wherein the annular sealing element is configured to be deformable elastically when the plug unit is connected to the bushing unit where the annular sealing element completely fills the annular space surrounding the annular sealing element, which is substantially closed on all sides in the connected state of the plug unit and the bushing unit, and the end side of the annular sealing element bears against an annular base side of the inner wall of the receiving recess, wherein the annular sealing element acts upon the outer wall of the plug region, in which the outer wall of the plug region bounds the annular space which is substantially closed on all sides, and the inner wall of the receiving recess with a predetermined sealing pressure, and h) wherein the plug housing includes a mounting region configured to form a releasable connection with the bushing unit.

13. The fluidic connecting device according to claim 12, in which the fastening region includes a groove region in which the annular sealing element is held.

14. The fluidic connecting device according to claim 13, in which the plug unit is configured to be pushable axially inside the receiving recess during a connection, wherein the annular space which is substantially closed on all sides and in which the annular sealing element has not reached an axial end position, in which the predetermined sealing pressure is achieved in the annular sealing element.

15. The fluidic connecting device according to claim 13, in which the head region, at least in an axially rearward subregion adjacent to the groove region, has a circumferential surface which is parallel to the longitudinal axis of the plug housing, wherein an outer contour of a cross section of the axially rearward subregion substantially corresponds to a cross section of the inner receiving recess.

16. The fluidic connecting device according to claim 15, characterized in that the front plug region, the rear plug region, and the annular sealing element each include a substantially circular-cylindrical outer contour.

17. The fluidic connecting device according to claim 16, in which the annular sealing element further includes a flat end surface in the shape of a circular ring and is substantially perpendicular to the longitudinal axis of the plug housing, and in that a circumferential surface of the annular sealing element is larger than by about a factor of five in relation to the annular sealing element end surface.

18. The fluidic connecting device according to claim 17, in which the end side of the annular sealing element bears against a base-side inner wall of the outer receiving recess.

19. The fluidic connecting device according to claim 18, in which the groove region protrudes into the inner receiving recess.

20. The fluidic connecting device according to claim 13, in which the annular sealing element has an outer circumferential surface which is parallel to the longitudinal axis of the plug housing and, in an unmounted state, the outer circumferential surface of the annular sealing element is substantially aligned with an outer circumferential surface of the rear plug region, the outer circumferential surface of the rear plug region also being parallel to the longitudinal axis of the plug housing, wherein an outer contour of a cross section of the rear plug region substantially corresponds to a cross section of the outer receiving recess.

21. The fluidic connecting device according to claim 12, in which the mounting region comprises a thread, wherein the thread of the mounting region connects to a thread of the bushing unit.

22. The fluidic connecting device according to claim 21, in which the thread of the mounting region is on the rear plug region of the plug housing.

23. The fluidic connecting device according to claim 22, in which the mounting region comprises a flange region that is connected to the rear plug region.

24. The fluidic connecting device according to claim 12, in which the annular sealing element comprises polyetheretherketone.

25. The fluidic connecting device according to claim 12, in which the fastening region includes a groove region in which the annular sealing element is engaged.

26. A fluidic plug unit for high-performance liquid chromatography (HPLC) components comprising:

a first liquid-conducting component including a plug housing having a channel extending therethrough along a longitudinal axis thereof and configured to withstand HPLC pressures, and including an elastically deformable annular sealing element having an outer circumferential seal surface substantially parallel to the longitudinal axis and an end side extending perpendicularly to the longitudinal axis; and a second liquid-conducting component including a bushing unit;

wherein the plug unit is configured to connect with the bushing unit of the second liquid-conducting component in a connected state, the bushing unit including a receiving recess having an inner receiving recess and an adjoining outer receiving recess having a constant opening cross section over the entire axial length and an annular base-side inner wall;

wherein the plug housing includes a plug region having a front plug region and a rear plug region disposed along the longitudinal axis;

wherein the front plug region includes a head region and a fastening region, the fastening region being disposed between the head region and the rear plug region;

wherein the annular sealing element is mounted on the fastening region with the end side adjacent the head region;

wherein the end side of the annular sealing element bears against the annular base side of the outer receiving recess when the plug unit and the bushing unit are in a connected state.

27. The plug unit according to claim 26, in which the annular base-side inner wall extends radially from the inner receiving recess.

28. The plug unit according to claim 26, in which the rear plug region includes an outer circumferential plug surface, and with the outer circumferential seal surface is substantially aligned with an outer circumferential plug surface.

\* \* \* \* \*

UNITED STATES PATENT AND TRADEMARK OFFICE
CERTIFICATE OF CORRECTION

PATENT NO.        : 9,982,820 B2
APPLICATION NO.   : 14/023888
DATED             : May 29, 2018
INVENTOR(S)       : Haeckel It is certified that error appears in the above-identified patent and that said Letters Patent is hereby corrected as shown below:

Claim 11, Column 11, Line 52 Replace "fluidic connecting device" with --plug unit--

Signed and Sealed this
Seventeenth Day of March, 2020

Andrei Iancu
*Director of the United States Patent and Trademark Office*